Feb. 22, 1927.

F. H. BRAMWELL 1,618,265

CATALYTIC APPARATUS

Filed May 1, 1926

INVENTOR
FRANCIS HERBERT BRAMWELL
BY
ATTORNEYS

Patented Feb. 22, 1927.

1,618,265

UNITED STATES PATENT OFFICE.

FRANCIS HERBERT BRAMWELL, OF HARTFORD, ENGLAND, ASSIGNOR TO ATMOSPHERIC NITROGEN CORPORATION, OF SOLVAY, NEW YORK, A CORPORATION OF NEW YORK.

CATALYTIC APPARATUS.

Application filed May 1, 1926, Serial No. 105,991, and in Great Britain May 4, 1925.

This invention relates to catalytic apparatus for the synthesis of ammonia, and more particularly to a converter in which ammonia is synthesized from its elements under the influence of a catalyst, pressure, and temperature.

In the production of synthetic ammonia the synthesis or make-up gas consisting of approximately one volume of nitrogen and three volumes hydrogen is subjected to catalysis under the influence of pressure and temperature. Before passing the gas in contact with the catalyst, it is preheated either by an auxiliary heater or by heat interchange relation with the hot catalyzed gas coming from the catalyst. The customary procedure under normal operation conditions is to preheat the synthesis gas by bringing it into intimate thermal contact with the hot catalyzed gas. After the synthesis gas has been preheated to a predetermined temperature the said gas is passed in contact with the catalyst. In order to obtain commercial yields of ammonia, pressures ranging up to hundreds of atmospheres and temperatures ranging up to several hundred degrees centigrade must be employed. The converter in which the catalyst is contained must be made therefore to resist pressure, temperature, and the deleterious effects of the reacting gases, of the products of reaction, and of other foreign matter or gas carried by the gas stream. This has necessitated up to the present, so far as I am aware, the use of various alloy steels in the construction of ammonia converters. The use of alloy steels present many disadvantages, the more important of which are the difficulty of working and fabricating, and the excessive capital investment required in the initial installation.

The object of the present invention is to provide a converter for a synthetic ammonia system which is free from the disadvantages noted hereinbefore and which possesses important features to be pointed out hereinafter.

Other objects and advantages will become obvious from the following description of a preferred embodiment of my invention taken in conjunction with the accompanying drawing thereof which illustrates a sectional view.

Figure 1:
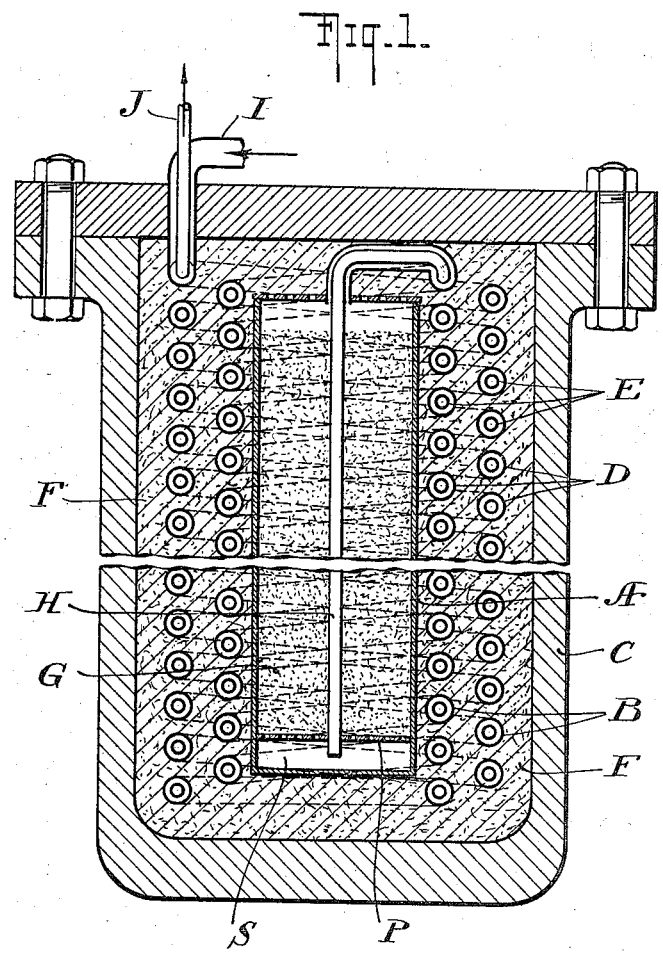
Fig. 1 is a sectional view of a preferred embodiment.
Figure 2:
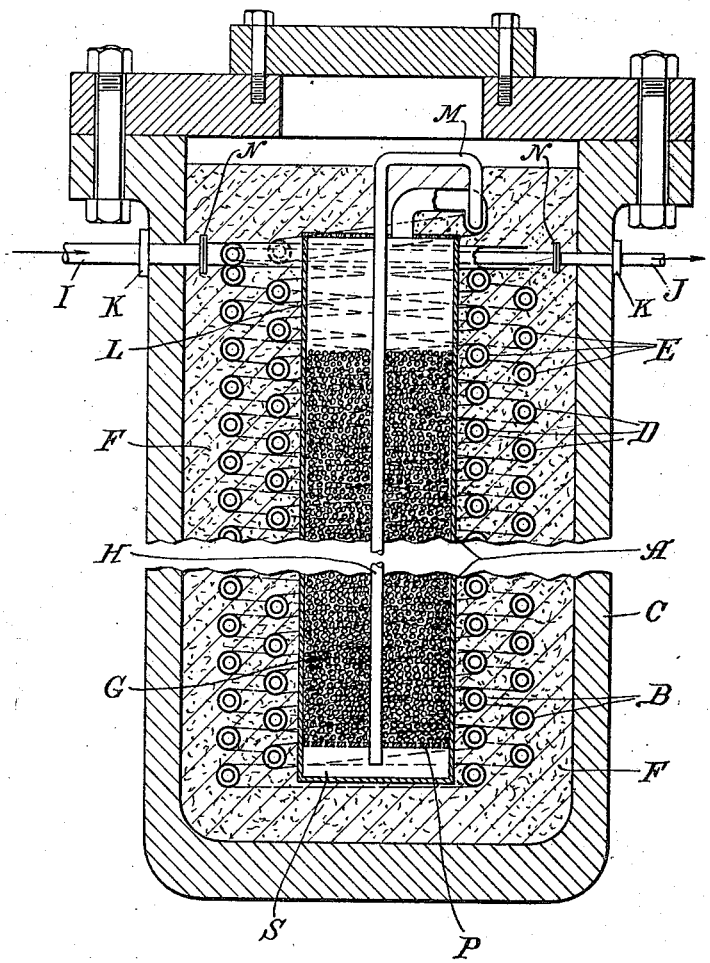
Fig. 2 is a sectional view of a modification.

In the drawings the letter C designates a pressure-resisting vessel in which the conversion or synthesis of ammonia is effected. A catalyst chamber A of any approved form and material is positioned, preferably centrally, within the vessel. Within the catalyst chamber a mass of catalytical material is arranged in any desirable manner upon a perforated plate P which is secured to the sides of the chamber above a gas space S at the bottom. Communicating with this space is an outlet or exit pipe H which extends through the catalyst chamber A and to a heat interchanger B. This heat interchanger consists of preferably a plurality of helices of two coaxial tubes D and E, the helices being arranged around the catalyst chamber and being preferably staggered with respect to each other so that the inner wall of the pressure-resisting vessel is screened and protected from the high temperature condition of the catalyst chamber. The inner pipe E connects the outlet pipe H within the catalyst chamber to a product pipe line J, whereas the outer pipe D connects the inlet line I for the synthesis or make-up gas to the upper portion of the catalyst chamber. In order to further isolate the catalyst chamber and heat-interchanger thermally from the inner wall of the vessel, insulating material or lagging F, such as asbestos, (which is heat resistant and chemically inert with respect to the gases present) is packed around the catalyst chamber and the heat interchanger. By interposing a heat interchanger and by packing insulating material between the catalyst chamber and the inner wall of the pressure-resisting vessel, the latter is protected thermally and is thus prevented from being heated excessively.

In the operation of my improved ammonia converter, the fresh or uncatalyzed synthesis gas, enters at I and flows through the annular space in the helical coils of the heat interchanger B. Simultaneously the hot catalyzed gas coming from the catalyst flows through the inner pipe E of the heat interchanger and transmits some of the heat thereof to the counter-current stream of colder gas in the annular space. The colder gas also abstracts heat from the space surrounding pipe D which is packed with asbestos. The gas passes through the catalyst to space S, and, thence, to outlet pipe H which leads to the heat interchanger B. After the hot catalyzed gas passes through the heat interchanger, it leaves the ammonia converter through outlet J which is connected with the ammonia removal or recovery apparatus (not shown). By my arrangement and mode of operation I have found that even when the catalyst chamber A is at a temperature of approximately 600° C. the temperature of the wall of the pressure-resisting vessel does not exceed 100° C. According to my invention, therefore, the pressure resisting vessel is protected from the heat liberated from the catalyst chamber and from the hot catalyzed gas, and is never endangered either thermally or otherwise deleteriously by gaseous uncatalyzed gases or products of the reaction. By utilizing my invention I am enabled to use mild steel in the construction of the pressure-resisting vessel instead of special and more expensive alloy steels that would otherwise be necessary. Moreover, this arrangement has the further advantages of economizing space in the converter and allowing ready accessibility to the catalyst.

While I have illustrated and described a preferred form of construction for carrying my invention into effect, it is understood that variations in embodiments may be made without departing from the scope and spirit of the invention.

I claim:

1. Catalytic apparatus for the synthesis of ammonia under pressure comprising an outer vessel having pressure-resisting walls, a catalyst chamber within said vessel, a heat interchanger forming a coil around the catalyst chamber and within the pressure vessel and consisting of helically disposed coaxial tubes, the inner tube being in communication with the hot gases from the catalyst chamber and the outer tube directing the uncatalyzed gas supply to the catalyst chamber, the relative arrangement being such that incoming cooler gases flow through the annulus between the inner and outer tubes while the hot gases from the catalyst chamber flow counter-current through the inner tube whereby a permanent temperature gradient of considerable magnitude is established between the catalyst and the pressure-resisting wall of the outer vessel.

2. Apparatus such as described in claim 1 in which the space between the outside coaxial tube, the outer wall of catalyst chamber, and the inner wall of the pressure vessel is packed with heat insulating, heat resistant material chemically inert with respect to gases in said space.

In testimony whereof I have hereunto set my hand.

FRANCIS H. BRAMWELL.